Jan. 6, 1925. Re. 15,978

E. A. QUINN

COMBINED OIL AND GAS FURNACE

Original Filed Nov. 30, 1921

INVENTOR
Edward A Quinn

BY
Miller Henry & Boykin
ATTORNEY

Reissued Jan. 6, 1925.

Re. 15,978

UNITED STATES PATENT OFFICE.

EDWARD A. QUINN, OF FRESNO, CALIFORNIA.

COMBINED OIL AND GAS FURNACE.

Original No. 1,432,087, dated October 17, 1922, Serial No. 518,985, filed November 30, 1921. Application for reissue filed September 2, 1924. Serial No. 735,496.

*To all whom it may concern:*

Be it known that I, EDWARD A. QUINN, a citizen of the United States, and resident of Fresno, in the county of Fresno and the State of California, have invented new and useful Improvements in Combined Oil and Gas Furnaces, of which the following is a specification.

My invention relates to an improved type of furnace and burner mounting wherein either oil or gas can be used for fuel. The object I have accomplished is the construction of a combination furnace in which manufactured or natural gas can be used economically as fuel, and if it is desired oil can be substituted, and heat developed from one burner will not overheat or melt the other burner. A further object is a gas burner construction and mounting in a furnace whereby the gas and air are most thoroughly mixed and burned, other objects will appear from the drawings and specifications which follow.

Figure 1:
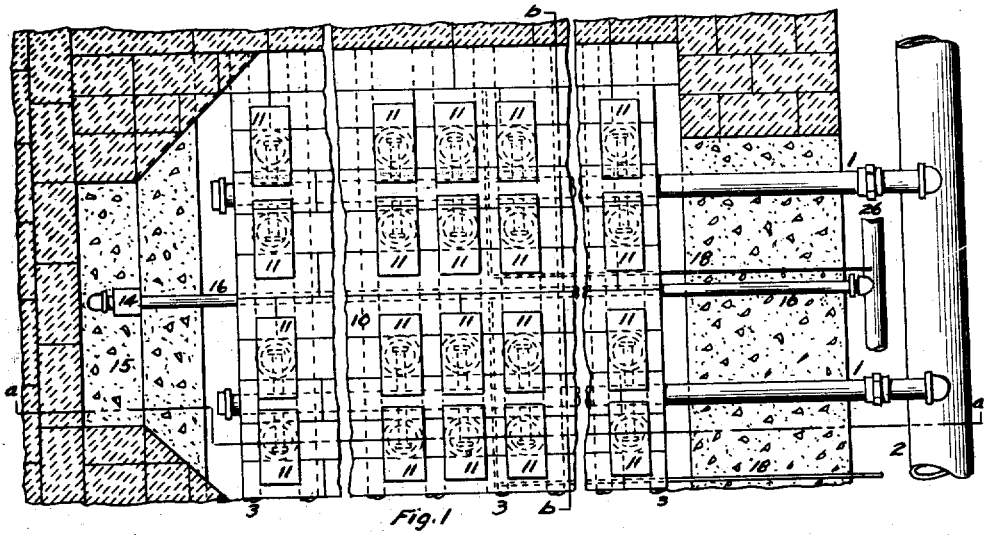

I attain these objects as hereinafter described and illustrated in the accompanying drawings, in which Figure 1 is a plain view of the furnace showing the burners within the combustion chamber.

Figure 2:
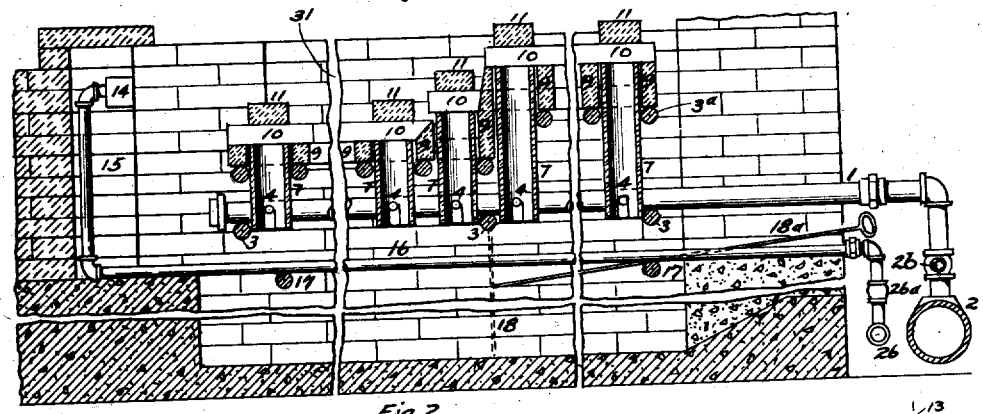
Figure 3:
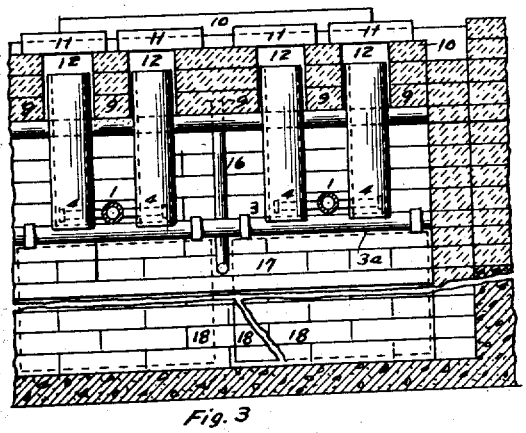

Figure 2 is an elevation partly in section along broken line *a—a* in Figure 1, showing the tiles in which the gas is discharged. This view also shows the location of the oil burner in relation to the gas burners. Figure 3 is a front elevation along sectional line *b—b* of Figure 1.

Figure 4:
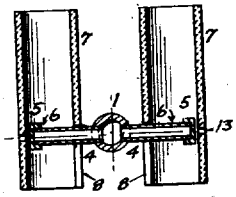
Figure 5:
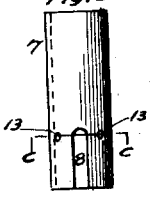
Figure 6:
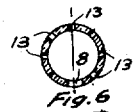

Figure 4 is a sectional elevation of two gas burners. Figure 5 is a detail side view of one of the tiles. Figure 6 is a cross sectional view of the tile along the line *c—c* of Figure 5. Similar reference characters refer to similar parts throughout the several figures.

Branch header 1 is connected to a source of fuel supply 2, and is supported by rods 3, 3, 3, the ends of which are supported by the furnace walls. Nipples 4 are connected to branch header 1 as shown more definitely in Figure 4, their ends being closed by caps 5, in order to force the gas to flow through a small hole or opening 6 in the nipple 4. A tile 7 is set over each nipple 4, a longitudinal slot 8 being provided in the side of the title 7 for the purpose of easily assembling the nipples and the tiles.

Tiles 7 are held in position by brick floor 9, said floor resting on supporting rods $3^a$, and is preferably constructed to the tops of the tiling. On the top of floor 9 is a course of fire bricks 10 arranged to leave apertures above the openings of each of the tiles. The floor is preferably arranged on an incline which rises as it recedes from the oil burner 14. When it is necessary to use oil burner 14 the flame and heat thereof are reflected upward by said floor.

I have placed a course of soap bricks 11 on top of the fire bricks 10, and over the openings in the tiles, thus forming an open space 12 shown in Figure 3 from which the flame and heat of the gas burners finds egress from the tiles into the furnace. Soap bricks 11 form a baffle for the flame and gas coming out of the tiling. Openings in the floor except the openings 12 referred to are filled in with asbestos and clay or the like.

The tiles 7, 7, have a plurality of holes 13, to admit air to aid combustion. The shutters or dampers 18 are hinged to rod or pipe 3, and are adjustable by a chain or rod $18^a$.

The oil burner 14 is placed in a compartment or alcove 15 at the back of the furnace, and so as to direct the flame over the soap brick baffles 11, from which it is reflected upward. The fuel supply pipe 16 to the oil burner is supported by rods 17, 17, and is connected with a source of oil supply 26. $26^a$ is a valve for regulating the supply of oil admitted to the burner. $2^b$ is a valve for regulating the supply of gas admitted to the furnace. The combustion chamber is preferably constructed of concrete and fire brick, and the parts supported therein in a conventional manner. The tiles as 7, 7, form mixing pipes and the combustion chamber of the furnace is shown at 31 and as above the floor 9.

I claim:

1. The combination within a combustion chamber of an oil burner adapted to direct a flame in an approximately horizontal plane a spaced distance therefrom, and a plurality of gas burners each of the gas burners being housed within a tiling arranged so the tops thereof are on an incline which rises as it recedes from the oil burner, the tops of the tiling being covered with refractory material except outlet openings for the flame generated within said tiling, substantially as described.

2. The combination within a combustion chamber of an oil burner adapted to direct a flame in an approximately horizontal plane a spaced distance therefrom, and a plurality of gas burners, each of the gas burners being housed within a tiling arranged so the tops thereof are on a line uniformly rising from said horizontal plane as they recede from the oil burner, the tops of the tiling being covered with refractory material except outlet openings for the flame generated within said tiling, the combustion chamber being filled with noncumbustible material to the approximate tops of the tiling, leads for supplying air to the interior of the tiling, substantially as described.

3. In combination with a combustion chamber, a gas burner within said chamber consisting of upright tubes of refractory material, means for discharging a jet of gas within each of said tubes, a plurality of holes through the walls of the tubes adjacent to the position where the gas is discharged, said tubes being partially covered at the top with refractory material, the tubes being arranged so that the level of the tops of the tubes to the rear of the furnace are lower than those near the front of the combustion chamber, and an oil burner within the combustion chamber at the rear end thereof adapted to throw a flame over the top of the tubes, substantially as described.

4. In a furnace having a combustion chamber, a plurality of vertical mixing pipes open at the top and spaced within the floor of said chamber, said pipes having their bottoms open for air inlet thereto, a gas outlet within each of said pipes and a refractory baffle over and spaced from each of said top openings whereby the burning gas is dispersed into said chamber.

5. In a furnace having a combustion chamber, a plurality of vertical mixing pipes open at the top and spaced within the floor of said chamber, said pipes having their bottoms open for air inlet thereto, a gas outlet within each of said pipes and a refractory baffle over and spaced from each of said top openings whereby the burning gas is dispersed into said chamber in a relatively transverse direction, said outlets and said baffles positioned in successive tiers of increasing elevation.

6. A furnace structure including elements as set forth in claim 4 wherein there is also a fuel oil burner adapted to direct a flame horizontally within said chamber and above said top opening.

7. A furnace structure including elements as set forth in claim 5 wherein there is also a fuel oil burner adapted to direct a flame horizontally within said chamber and above said top opening.

8. A furnace structure including elements as set forth in claim 6 wherein there is also a fuel oil burner adapted to direct a flame horizontally within said chamber and above said top opening.

EDWARD A. QUINN.